Sept. 18, 1962 P. O. MARTI, JR 3,054,258
TEMPERATURE RISE RETARDATION OF SURFACES
EXPOSED TO HEAT
Filed Oct. 28, 1957

INVENTOR.
Paul O. Marti, Jr.
BY Michael Dufriecy
ATTORNEY

United States Patent Office 3,054,258
Patented Sept. 18, 1962

3,054,258
TEMPERATURE RISE RETARDATION OF SURFACES EXPOSED TO HEAT
Paul O. Marti, Jr., Seymour, Ind., assignor to Standard Oil Company, Chicago, Ill., a corporation of Indiana
Filed Oct. 28, 1957, Ser. No. 692,967
5 Claims. (Cl. 60—39.47)

This invention relates to surfaces exposed to above atmospheric temperatures and more particularly relates to controlling the rate of temperature rise or maximum temperature reached by a surface exposed to elevated temperatures. Even more particularly the invention relates to gas generators and rockets.

In many fields the problem of protecting materials from the effects of temperature increase have been met by the use of insulation positioned between the surface of the material to be protected and the source of heat. The conventional insulating means are bulky and heavy. In aircraft systems components need to be protected from excesssive heating. For example; instruments located in compartments near the jet engine need to be maintained at a relatively low temperature in order to prevent a faulty operation or even failure due to elevated temperature. In the field of rockets and missiles the problem is even more intense because weight carries a penalty in pay load. In gas generators and rocket motors the walls forming the generator or motor are exposed to temperatures of several thousand degrees F. at times. At these high temperatures the materials of construction lose most of their strength and the necessary strength must be obtained by making the walls of considerable thickness. The gas exit nozzles of gas generators and rocket motors are particularly susceptible to loss of strength due to extremely high temperature and also due to erosion at high temperature; at the same time these areas are very difficult to maintain at a temperature affording the necessary strength commensurate with minimum weight. Particularly in one-shot use operation such as rockets the problem is not one of maintaining a surface at a particular temperature for a prolonged period of time, but one of controlling the maximum temperature reached by the surface at a particular period of time of operation. In other words the problem amounts to one of reducing the rate of temperature rise of the surface exposed to heat below the normal rate in order that the surface will still have the necessary strength when the life period of the particular gas generator or rocket motor has been reached.

An object of the invention is a method of reducing the normal rate of temperature rise of a surface exposed to above atmospheric temperatures. Another object is a method of controlling the maximum temperature reached by surfaces exposed to above atmospheric temperatures. A further object is a method of decreasing the normal rate of temperature rise of a surface exposed to above average atmospheric temperatures by utilizing a light weight heat barrier. Another particular object is a method of controlling the maximum wall temperature of gas generator and rocket motors by the use of a light weight simple heat barrier. Yet another object is a gas generator for producing combustion gases at elevated temperatures which gas generator is provided with a simple heat barrier which reduces the normal rate of temperature rise of the walls of the gas generator. Still another object is a gas generator wherein the gas exit nozzle is operated at a controlled maximum temperature. Other objects will become apparent in the course of the detailed description of the invention.

FIGURE 1 sets out one form of a gas generator or rocket motor utilizing the construction of the instant invention.

Figure 1:
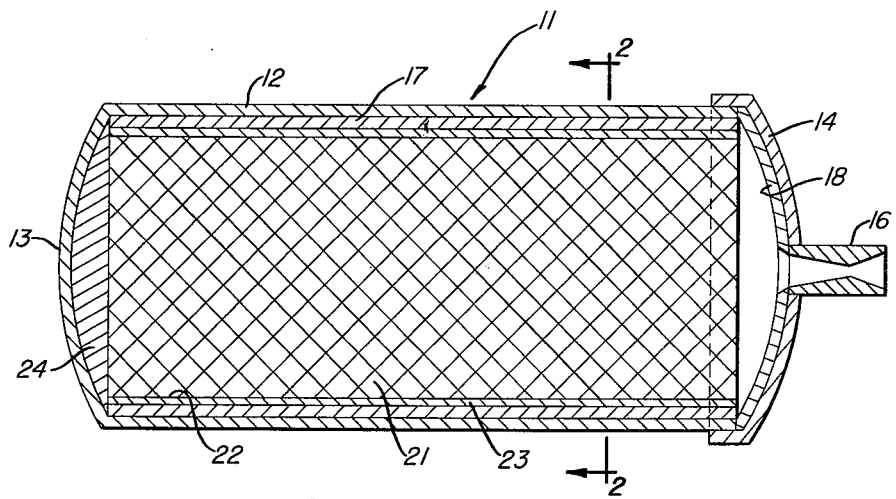

It has been discovered that inorganic salt hydrates are able to act as heat barriers or "coolant." A very thin coat of such an inorganic salt hydrate on a surface will effectively reduce the temperature rise of that surface as effectively as a thick coat of conventional insulating means. The inorganic salt hydrates which maintain the hydrated condition, i.e., do not split off hydrate water at higher atmospheric temperatures are suitable for use in the invention. Herein higher atmospheric temperature is understood to mean temperatures about 120° F. It is to be understood that when a surface protected by the inorganic salt hydrate is to be used in tropical regions wherein temperatures which frequently exceed 120° F. inorganic salt hydrate should be used which will not lose its hydrate water at the atmospheric temperatures to be encountered. The term "hydrate stability" used herein is intended to mean a condition at which the particular salt retains its essential identity as a chemical combination of salt and water. The term "hydrate instability" is intended to mean the condition at which the hydrate salt loses its combined form and water is given off leaving either an anhydrous salt or a salt having a lesser number of molecules of hydrate water combined with each salt molecule.

In addition to the limitation of hydrate stability at temperatures below about 120° F. the salt hydrate used should neither be deliquescent nor efflorescent at the particular conditions of addition. It is to be understood that salts which would normally be deliquescent or efflorescent at particular atmospheric conditions may be used for the purposes of the invention when the barrier or coolant body is not directly exposed to the harmful atmospheric conditions, for example aluminum chloride hydrate is extremely deliquescent at ordinary atmospheric temperatures and humidity. However, by operation in a dehumidified atmosphere an aluminum chloride hydrate body can be positioned inside a gas generator which is then sealed from the atmosphere. The gas generator may then be stored and transported without danger of impairment of the body of aluminum chloride hydrate since atmospheric humidity does not reach said body.

The inorganic salt hydrates may be used not only to control the rise in temperature of a surface but may be used to control the maximum temperature reached by that surface exposed to a particular heat source. Inorganic salt hydrates lose hydrate water at different temperatures. When it is desired to control the maximum temperature reached by a surface the salt hydrate used should have a water loss temperature below and preferably on the order of the maximum temperature at which the surface is to reach; sufficient salt hydrate must also be present to protect the surface at the desired maximum temperature or below a maximum temperature of the period of time that the surface is desired to be protected.

Illustrative inorganic salt hydrates which may be used for the purposes of the invention are set out hereafter: aluminum chloride, $AlCl_3 \cdot 6H_2O$; aluminum fluoride, $AlF_3 \cdot 3\frac{1}{2}H_2O$; aluminum oxide, $Al_2O_3 \cdot 3H_2O$; aluminum sulfate, $Al_2(SO_4)_3 \cdot 18H_2O$; ammonium aluminum sulfate $NH_4Al(SO_4)_2 \cdot 12H_2O$; ammonium ferric sulfate, $$NH_4Fe(SO_4)_2 \cdot 12H_2O$$

ammonium chloride magnesium chloride $$NH_4Cl \cdot MgCl_2 \cdot 6H_2O$$

magnesium ammonium phosphate, $NH_4MgPO_4 \cdot 6H_2O$; magnesium orthophosphate mono-H, $MgHPO_4 \cdot 7H_2O$; chromium phosphate, $CrPO_4 \cdot 6H_2O$; lithium metaborate $LiBO_2 \cdot 8H_2O$; magnesium metaborate, $MgBO_2 \cdot 8H_2O$; magnesium sulfate, $MgSO_4 \cdot 7H_2O$; sodium silicate, $Na_2SiO_3 \cdot 9H_2O$; sodium aluminum sulfate, $$NaAlSO_4 \cdot 12H_2O$$

sodium tetraborate, $Na_2B_4O_7 \cdot 10H_2O$; sodium orthophosphate, $Na_3PO_4 \cdot 10H_2O$; lithium orthophosphate, $$Li_3PO_4 \cdot 10H_2O$$

sodium sulfate, $Na_2S \cdot 9H_2O$; magnesium chloride, $MgCl_2 \cdot 6H_2O$; calcium carbonate $CaCO_3 \cdot 6H_2O$; sodium carbonate $Na_2CO_3 \cdot 10H_2O$; sodium carbonate $$Na_2CO_3 \cdot 7H_2O$$

The surface which is to be protected from heat or maintained at or below a particular temperature may be any material of construction which retains its rigidity at the particular temperature of operation. Thus, the inorganic salt hydrates may be used to protect any metallic material of construction. The invention is particularly useful in that it permits the use of cheaper materials of construction by keeping the temperature below the point at which the strength of the material is completely lost. For example, ordinary carbon steel may be utilized, instead of expensive stainless steel by keeping the temperature of the metal on the order of 500–600° F. On the other hand thin stainless steel sheets may be utilized for the construction of gas generators instead of expensive titanium and hastelloy materials by keeping the temperature of the vessel wall below 1000° F. Also it is possible to utilize plastics as materials of construction despite exposure to above atmospheric temperatures where normally the loss of strength would be prohibitive by the use of the inorganic salt to protect the plastic surface from an otherwise normal temperature rise. Thus, the glass fiber re-enforced plastics may be used as extremely light weight materials of construction in rockets and gas generators, by using an inorganic salt hydrate system alone or in combination with other insulating means to maintain the surface of the re-enforced plastic below its decomposition point.

The protective action of the defined salt hydrate is not limited to that of a heat barrier, as in ordinary insulation, but is also suitable for affording a cooling effect. Thus, the body of inorganic salt hydrate may be interposed with respect to the surface to be protected and the source of heat which normally would raise the temperature of that surface. On the other hand the body of inorganic salt hydrate may be positioned so that the surface, i.e., wall or sheet or plate lies between the body of hydrate and the source of heat. In this application the body of salt hydrate cools in effect the surface being heated and decreases the normal rate of temperature rise or even maintains the temperature of that surface substantially constant.

The body of the inorganic salt hydrate is placed adjacent to the surface which is to be exposed to above atmospheric temperatures, i.e., above 120° F. The body of salt hydrate may be a planar-body or it may have a varying thickness dependent upon the requirements of the surface which is to be protected from heat. The body of salt hydrate may be placed immediately contiguous with the surface to be protected; in this instance the body of salt hydrate may be in direct contact with the surface or it may be in direct contact with an efficient heat transmitting material which material is in direct contact with the surface to be protected. When the material to be protected lies between the heat source and the salt hydrate it is preferred that the body of salt hydrate be in direct contact with the surface of the material to be protected from overheating.

When the body of salt hydrate is interposed with respect to the heat source and the surface to be protected the body of salt hydrate need not be immediately contiguous to the surface to be protected. The body of salt hydrate may be physically separated from that surface with a void or gas-gap between the body of salt hydrate and the surface. Or, a further insulating means may be positioned between the body of salt hydrate and the surface to be protected. On the other hand the body of salt hydrate may have interposed between it and the source of heat a barrier. To illustrate the body of salt hydrate may be positioned in direct contact with the surface to be protected and interposed with respect to the heat source. A metal sheet or liner may be interposed between the salt hydrate and the heat source to further reduce temperature rise or to assist in maintaining in position the body of salt hydrate.

A convenient form of using the salt hydrate is the preparation of a sandwich wherein a planar-body of salt hydrate is placed between two thin metal sheets such as aluminum foil. The sandwich may then be conveniently positioned against the surface to be protected. In such an instance it is preferred that the layer of holding material facing the source of heat should be provided with perforations so that water vapor formed during the dehydration may readily pass out of the body of the remaining salt hydrate.

A convenient and extremely simple method of applying the salt hydrate body is to mix the salt hydrate with a material that forms a matrix and simultaneously acts as an adhesive for holding salt hydrate in position immediately contiguous to the surface to be protected. The adhesive material is preferably one which does not readily decompose at operating temperatures or if it decomposes forms an adherent mass that retains the salt in position at the surface being protected, rather than spalling off the surface. Many adhesives are suitable particularly those comprising synthetic resins of the type of polybutenes, rubbers dissolved in solvents, copolymers of styrene and butadiene and epoxy resins. In general the best results are obtained if the salt hydrate is admixed with the matrix forming material in the presence of a solvent for the matrix former which solvent readily vaporizes leaving an adherent planar-body or coating of inorganic salt hydrate imbedded in a matrix of material. The amount of matrix former used is of course dependent upon the particular matrix former and the particular salt hydrate used to form the protective coating.

The invention is further described in detail in connection with the annexed figures which form a part of this specification.

FIGURE 1 shows a simplified form of a gas generator or rocket motor using a solid propellant as the source of combustion gases. In FIGURE 1 the gas generator comprises a metal vessel 11 which is formed of a substantially cylindrical central wall portion 12, a domed end closure 13 and a domed forward end closure 14. A gas exit conduit 16 is positioned in end closure 14. In this embodiment the vessel walls 12, 13, and 14 are made of stainless steel. It is to be understood that for clarity the vessel walls have been made disproportionately thick.

The cylindrical wall 12 and a part of closure 14 are protected from temperatures above the maximum permissible for the particular stainless steel by a salt hydrate body 17 and 18, respectively. In this embodiment a salt hydrate has been admixed with a commercial synthetic resin adhesive dissolved in a ketone solvent and the mixture applied to the wall 12 to a thickness of about ¼ inch. In the case of planar-body 18 a thicker coating is placed in order to help withstand the erosive effect of the gases striking against the coating 18 from the combustion of solid propellant 21. Although none is utilized in this embodiment a thin metal sheet may be interposed between the surface of coating 18 and the interior of the gas generator. The presence of the metal liners reduces the erosive action and permits the use of a thinner coating of salt hydrate.

The combustion gases are produced by the burning of a solid propellant grain 21 positioned in the interior of the gas generator. In order to provide a long time burning solid propellant grain 21 is restricted on its cylindrical surface 22 with a restrictor 23.

The solid propellant may be any one of the propellants known to the art such as, a perchlorate—asphalt mix, an ammonium nitrate—synthetic rubber mix, etc. The restrictor coating is any means applied to the surface of the grain which prevents that surface from burning. In this embodiment grain 21 burns in cigarette fashion from the surface closest to nozzle 16 toward closure 13. The dead space 24 at the closure 13 end of the vessel is occupied by filler preferably a light weight material.

Figure 2:
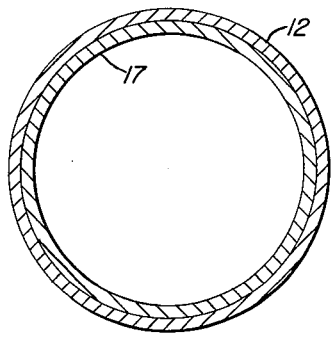
FIGURE 2 is a view across the plan 2—2 of the gas generator of FIGURE 1.

In FIGURE 2 grain 21 and restrictor 23 have been omitted in order to show more clearly the manner in which coating 17 is immediately contiguous to the interior surface of cylindrical wall 12.

It is apparent that as grain 21 burns the hot gases will flare out and impinge on coating 17 on wall 12. The maximum temperature reached will be on or near closure 14 and it may be necessary in some instances to have the amount of salt hydrate on wall 12 thicker near closure 14 than near closure 13.

Figure 3:
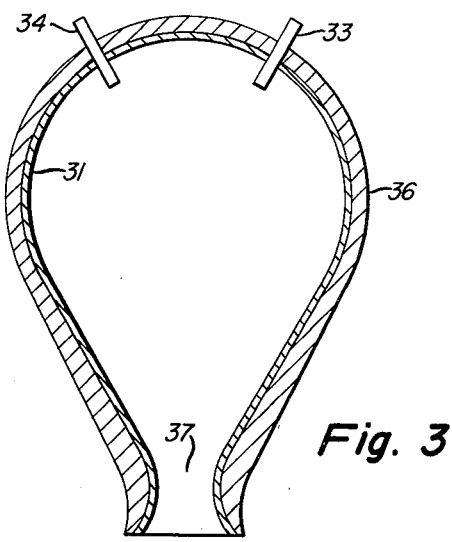
FIGURE 3 shows a simplified embodiment of a liquid fuel rocket motor utilizing the temperature control means of the instant invention.

FIGURE 3 sets out a simple form of a liquid fuel rocket motor. The body of the motor is formed by the pear shaped vessel 31, which is provided with a gas exit conduit 32 injectors 33 and 34 are provided to introduce the fuel and the oxidizer into interior vessel 31. The fuel and oxidizer may be ignited by ignition means not shown or may be spontaneously ignited. Also a monofuel such as nitromethane may be used.

In this particular embodiment the wall of vessel 31 is of stainless steel and gas exit conduit 32 is of highly erosive resistant material such as titanium. A coating 36 of inorganic salt hydrate and an adhesive matrix is positioned in direct contact with the outside surface of vessel 31 and conduit 32 herein the thickness of the coating falls in accordance with the amount of "cooling" which must be done. The maximum heat removal is needed in the vicinity of nozzle throat 37 and the coating 36 is correspondingly thickened in this region. It is normal in this type of operation to circulate liquid fuel through tubes encircling not only nozzle conduit 32 but the vessel 31 itself. The inorganic salt hydrate system may be used to augment the cooling obtained by the conventional general circulation, and therefore permit the use of cheaper materials of construction by having the temperature decreased below that obtainable by salt hydrate alone.

For some applications it will be desirable to have a body of inorganic salt hydrate positioned adjacent to the interior surface of vessel 31 with provisions made to reduce erosion losses by interposing a metal shield between the body of salt hydrate and the hot combustion gases present in the motor. In some cases the interior positioning may be sufficient and in others it may be desirable to have both an interior body of salt hydrate and an exterior body, in effect sandwiching the wall of motor 1 between two layers of salt hydrate.

It can be sen from these embodiments that many other uses for the salt hydrate protective system are possible, particularly when a one time protection is all that is needed. For example, instruments that are to be protected against a destructive temperature may be positioned in a container to which a coat of salt hydrate has been applied on the side facing the source of heat; thereby the instruments operate in the safe temperature maintained within the compartment.

TEST

Results obtainable with salt hydrate system of the invention are illustrated by the following tests. In these tests a rocket motor of the general layout shown in FIGURE 1 was used for test purposes. In these tests the propellant grain was a rod having a diameter of 9 inches and a length of about 25 inches. The propellant comprised of ammonium nitrate, a plastic binder and a combustion catalyst. The grain was restricted with a synthetic plastic restrictor on the cylindrical surface causing the grain to burn cigarette fashion. In general the grain burned to deliver gas on the order of 800 p.s.i. for a time of about 250 seconds, the flame temperature of the gas was about 1800° F. The tests were carried out in concrete shelter with air temperatures ranging from about 75° to 90° F. No artificial cooling means were directed toward the outside of the test motor and the test stand was protected from atmospheric wind. The temperature of various parts of the vessel and nozzle was determined by thermocouples using equipment which automatically recorded temperatures over the total time of gas generation. In test 1 no means were utilized to protect the vessel wall from the flames produced in the burning of the solid propellant. The grain burned for 250 seconds and the maximum temperature reached at any point on the vessel was about 1300° F. In all the tests it was found that one particular point on the cylindrical portion of the motor gave the maximum temperature and ° F. reported herein are at that maximum point.

In test No. 2 a commercial material made of mica flakes was introduced into the motor touching or resting against the interior of the cylindrical portion of the motor. After a burnout time of 242 seconds the maximum record temperature was 700° F.

In test No. 3 a sheet metal liner was inserted into the motor resting against the interior wall. This sheet metal liner acts as a reflector insulation. It was effective to some extent in that the maximum temperature was reduced to 1100° F.

Tests 4, 5, 6, 7 and 8 were carried out using an inorganic salt hydrate; in each case 1200 grams of the particular hydrate was admixed with 400 grams of a commercial adhesive. This commercial adhesive is a synthetic copolymer of styrene and butadiene. The commercial form consists of a 20 percent solution of the copolymer dissolved in a ketone. Thus, the synthetic copolymer forms a matrix of about 80 grams–1200 grams of salt hydrate after the solvent had been evaporated. In the tests the mixture of hydrate and adhesive solution was painted on to the interior cylindrical walls of the motor to form a coating about $\frac{1}{16}$ inch thick thereof. This coating was very adherent after exposure to 250 seconds of hot combustion gases and exhibited little or no spalling from the metal wall.

In order to maximize the temperature decrease tests were carried out with the sheet metal liner imposed with respect to the salt hydrate-matrix coating and the solid propellant. Test No. 4 utilized sodium tetraborate hydrate after 260 seconds the maximum temperature was 690° F. or a lowering of approximately 400° over test No. 3; test No. 5 with aluminum sulfate hydrate gas at a final temperature of 480° F.

Tests 6, 7 and 8 were carried out interposing a mica flake sheet with respect to the salt hydrate-matrix coating and the solid propellant. In test No. 6 using aluminum sulfate hydrate the final temperature was only 230° F.— a $\frac{3}{64}$ inch mica sheet was used. In test No. 8 using a sodium sulfate hydrate and a $\frac{1}{16}$ mica sheet the temperature after 170 seconds was 170° F. A mechanical failure limited the burning time of this test to 170 seconds.

For convenience the results of these tests have been placed in the table which is part of this specification.

Table

| Test Number | Heat Retarding Means | | Gas Generation Time, Seconds | Maximum Temperature °F |
|---|---|---|---|---|
| | Salt Hydrate System | Liner | | |
| 1 | None | None | 250 | ca 1,300 |
| 2 | ---do--- | (a) | 242 | 700 |
| 3 | ---do--- | (b) | 250 | 1,100 |
| 4 | $Na_2B_4O_7 \cdot 10H_2O$ | (c) | 260 | 690 |
| 5 | $Al_2(SO_4)_3 \cdot 18H_2O$ | (c) | 250 | 480 |
| 6 | $Al_2(SO_4)_3 \cdot 18H_2O$ | (d) | 250 | 230 |
| 7 | $Na_2SiO_3 \cdot 9H_2O$ | (e) | 250 | 370 |
| 8 | $Na_3PO_4 \cdot 10H_2O$ | (f) | 170 | 170 | a 3/64 inch mica sheet resting aginst interior wall.
b 0.012 inch sheet metal resting against interior wall.
c 0.012 inch sheet metal between salt hydrate coat and the gas.
d 3/64 inch mica sheet between salt hydrate coat and the gas.
e 1/32 inch mica sheet between salt hydrate coat and the gas.
f 1/16 inch mica sheet between salt hydrate coat and the gas.

These data show conclusively that the objects of the invention with respect to controlling the temperature of a wall exposed to high temperatures have been obtained by using a very simple economical system. Thus having described the invention, what is claimed is:

1. A generator for producing gas at elevated temperature and pressure for a substantial period of time which gas generator comprises a metal vessel provided with a gas exit conduit, a solid propellant positioned in said vessel, said propellant being present in an amount sufficient to produce hot gases continuously for a substantial period of time, means for igniting said propellant and, adjacent to a substantial portion of the interior surfaces of said vessel, a planar-body of an inorganic salt hydrate and an adhesive matrix therefor which is characterized by hydrate stability at temperatures below about 120° F. and hydrate instability below the maximum working temperature of the metal forming said vessel, said hydrate being present in an amount to maintain the temperature of the metal vessel below said maximum temperatures over the period of gas generation.

2. The generator of claim 1 wherein said body is positioned immediately contiguous to the inner surface of the metal wall.

3. The generator of claim 1 wherein said hydrate is sodium phosphate decahydrate.

4. The generator of claim 1 wherein said hydrate is sodium silicate nonahydrate.

5. The generator of claim 1 wherein said hydrate is aluminum sulfate octadecahydrate.

References Cited in the file of this patent

UNITED STATES PATENTS

| | | |
|---|---|---|
| 958,990 | Bourdelles | May 24, 1910 |
| 1,187,779 | Patten | June 20, 1916 |
| 2,413,516 | Pratt et al. | Dec. 31, 1946 |
| 2,658,332 | Nicholson | Nov. 10, 1953 |
| 2,779,281 | Maurice et al. | Jan. 29, 1957 |

FOREIGN PATENTS

| | | |
|---|---|---|
| 1,003,758 | France | Nov. 21, 1951 |
| 205,022 | Great Britain | Oct. 11, 1923 |
| 432,850 | Great Britain | Aug. 2, 1935 |
| 585,848 | Great Britain | Feb. 27, 1947 |